United States Patent [19]

Fanelli et al.

[11] Patent Number: 5,292,489
[45] Date of Patent: Mar. 8, 1994

[54] TERNARY SILICON-RARE EARTH NITRIDES AND PROCESS FOR THEIR PREPARATION

[75] Inventors: Anthony J. Fanelli, Rockaway, N.J.; Jeffrey P. Solar, Silver Spring, Md.; Beili L. Wu; Jean Yamanis, both of Morristown, both of N.J.

[73] Assignee: AlliedSignal Inc., Morristownship, N.J.

[21] Appl. No.: 720,272

[22] Filed: Jun. 24, 1991

[51] Int. Cl.⁵ ............................................. C04B 35/58
[52] U.S. Cl. .................................. 423/21.1; 423/324; 501/97
[58] Field of Search ...................... 423/21.1, 21.5, 324; 501/97, 98

[56] References Cited

FOREIGN PATENT DOCUMENTS 0027655 2/1985 Japan .
1-134251 5/1989 Japan .
2032414 5/1980 United Kingdom .

OTHER PUBLICATIONS

Inoue et al., "A crystallographic study of a new compound of lanthanum silicon nitride, $LaSi_3N_5$", J. Mat. Sci., 15, pp. 2915-2920, (1980), Chapman & Hall Ltd. (no month avail.).

Z. Inoue, "A new role for nitrogen in silicon nitride and related ceramics", J. Mat. Sci. Letters, 4, pp. 656-658, (1985), Chapman & Hall Ltd. (no month avail.).

Holcombe et al., "Advanced Ceramic Materials for Hydrogen-Fluorine Environments" Am. Cer. Soc. Bull., 60, pp. 546-548 (1981) (no month avail.).

Wills et al., "The silicon lanthanide oxynitrides", J. Mat. Sci., 11, pp. 749-759, (1979) (no month avail.).

Primary Examiner—David Brunsman
Attorney, Agent, or Firm—Ernest D. Buff; Gerhard H. Fuchs

[57] ABSTRACT

This invention provides a compound having the formula $LnSi_3N_5$ wherein Ln is selected from the group consisting of scandium, yttrium, cerium, praseodymium, neodymium, promethium, samarium, europium, gadolinium, terbium, dysprosium, holmium, erbium, thulium, ytterbium, and lutetium. In addition, there is provided a method for making the compound $Ln'Si_3N_5$ wherein Ln' is a radical selected from the group consisting of lanthanum, scandium, yttrium, cerium, praseodymium, neodymium, promethium, samarium, europium, gadolinium, terbium, dysprosium, holmium, erbium, thulium, ytterbium and lutetium, comprising the step of reacting $SiO_2$, $Ln'_xO_y$ in a nitrogen atmosphere in the presence of carbon at a temperature of from 1200° C. to about 2000° C. for at least 2 hrs., x being an integer equal to or greater than 2, y being an integer equal to or greater than 3, and z being an integer selected from 1 and 2, with the proviso that x and y are selected to result in a stable compound of $Ln'_xO_y$.

11 Claims, 5 Drawing Sheets

TERNARY SILICON-RARE EARTH NITRIDES AND PROCESS FOR THEIR PREPARATION

1. BACKGROUND OF THE INVENTION

The present invention is in the field of ceramics; more particularly the invention relates to ternary silicon-rare earth nitrides and a process for their preparation.

Lanthanum silicon nitride, $LaSi_3N_5$, has been disclosed in Inoue et al., "A Crystallographic Study of a New Compound of Lanthanum Silicon Nitride, $LaSi_3N_5$", J. of Mat. Sci., Vol. 15, pg. 2915, Chapman & Hall Ltd., (1980). The compound has been indicated to be prepared by a reaction between $Si_3N_4$ and $La_2O_3$ under a 50 atmosphere nitrogen pressure at 2000° C. for 2 hrs. in a pressure furnace. Inoue et al. presents a crystallographic study of this lanthanum silicon nitride compound. Inoue recognizes that other compounds from the same column of the periodic table have been known. However, these compounds contain oxygen. One such compound disclosed is yttrium silicon oxynitride.

In another paper, "A New Role for Nitrogen and Silicon Nitride and Related Ceramics", J. of Mat. Sci. Letters, Vol. 4, pg. 656, Chapman & Hall Ltd., (1985), Inoue addresses silicon nitride and related ceramics and their structure.

Holcombe et al., "Advanced Ceramic Materials for Hydrogen Fluorine Environments", Am. Ceramic Soc. Bull., Vol. 60, pp. 546-548, (1981), disclosed that 10 lanthanum containing compounds or composites were investigated in a controlled $F_2/H_2$ flame. Included in the evaluation was $LaN \cdot Si_3N_4$. This article concluded that all the materials studied exhibited maximum use temperature greater than that for nickel. The lanthanum hexaboride composites were found to be the best materials.

Carbothermal reduction syntheses of single metal nitrides such as $Si_3N_4$ and AlN are well known. This process has also been used for the synthesis of beta-sialons (Si—Al—O—N compounds) using mixtures of $SiO_2$, $Al_2O_3$ and carbon. However, the use of carbothermal reduction for the preparation of ternary metal nitride compounds which do not contain oxygen (except as an impurity) has not been reported.

Although the chemistry of the Ln—Si—O—N system has been previously studied, the carbothermal reduction of mixtures of rare earth oxides with silicon dioxide has not been reported. Wills et al. (J. Mat. Sci., Vol. 11, (1979) pp. 749-759) have, for example, shown that the reaction of rare earth oxides with silicon nitride leads to the formation of rare earth silicon oxynitrides. Similar compounds have been claimed to form during the densification of silicon nitride using rare earth oxides as sintering aids. Thus, the carbothermal reduction process is unique in allowing the synthesis of ternary metal nitrides rather than the formation of oxynitrides.

Non-oxide compounds such as silicon nitride are generally difficult to densify in the absence of sintering additives. These additives, usually metal oxides, promote sintering by formation of liquid phase with a liquidus temperature below the processing temperature. However, the residual intergranular phase leads to reduction in the high temperature strength and renders the material susceptible to creep damage.

2. SUMMARY OF THE INVENTION

The present invention is directed to a compound having the formula $LnSi_3N_5$ wherein Ln is selected from the group consisting of scandium, yttrium, cerium, praseodymium, neodymium, promethium, samarium, europium, gadolinium, terbium, dysprosium, holmium, erbium, thulium, ytterbium and lutetium.

The present invention also includes a method to make a compound having the formula $Ln'Si_3N_5$ wherein $Ln'$ is selected from the group consisting of lanthanum, scandium, yttrium, cerium, praseodymium, neodymium, promethium, samarium, europium, gadolinium, terbium, dysprosium, holmium, erbium, thulium, ytterbium and lutetium, comprising the step reacting $SiO_z$, $Ln'_xO_y$ in a nitrogen atmosphere in the presence of carbon at a temperature of from 1200° C. to 2000° C. for at least 2 hrs., wherein z is an integer selected from 1 and 2, x is an integer equal to or greater than 2, y is an integer equal to or greater than 3, with the proviso that x and y are selected to result in a stable compound of $Ln'_xO_y$.

The method comprises reacting $SiO_z$, $Ln'_xO_y$ in a nitrogen atmosphere in the presence of carbon at a temperature of from 1200° C. to 2000° C., preferably 1200° C. to 1800° C., more preferably 1300° C. to 1500° C., and most preferably from 1400° C. to 1450° C. for a period of at least 2 hrs., preferably from 4 to 8 hours. The pressure can be any suitable pressure and is preferably about atmospheric pressure. x is an integer greater or equal to 2 and is preferably 2, y is an integer greater or equal to 3 and is preferably 3. x and y should be selected to result in a stable compound of $Ln'_xO_y$. The relative amounts of $SiO_z$, $Ln_xO_y$ and carbon are preferably present in stoichiometric quantities. A slight excess of carbon is preferred. The atmosphere of nitrogen is continually replenished with a constant flow.

While the preparation of lanthanum silicon nitride, $LaSi_3N_5$ has recently been reported as indicated in Inoue et al., the rare earth analogs of the formula $LnSi_3N_5$ have never been made. As indicated by the severe processing conditions, the existence and method of making such compounds could not be predicted.

Previous synthesis of the lanthanum silicon nitride have required high temperatures and pressures. For example, Inoue et al. described in the background above to have prepared $LaSi_3N_5$ by heating the mixture of $Si_3N_4$ and $La_2O_3$ at 2000° C. under 50 atmospheres of nitrogen, and hotpressing the mixture of $Si_3N_4$ with LaN at 1700° C. in a nitrogen atmosphere with a pressure of 150 kg/$cm^2$. The Holcombe reference referred to above, similarly required extreme temperatures and pressures.

The method of this invention allows the synthesis of ternary metal nitrides to be carried out under less demanding conditions than disclosed in the art. Such a process has been and can be carried out in ordinary and high temperature furnace without the need for exotic pressure equipment. The use of lower temperatures allows the preparation of the ternary nitride as a fine, free flowing powder without the occurrence of sintering which can lead to the formation of hard agglomerates at high temperature. In addition, the process of the present invention avoids the use of air and moisture sensitive nitrides as starting materials and does not require special apparatus to prevent contact of these starting materials with the ambient atmosphere.

Further, the various compounds of the present invention could not be predicated. The compounds of the rare earth column of the Periodic Table vary in stability as well as crystalline structure, as discovered in the present invention.

BRIEF DESCRIPTION OF THE DRAWINGS

The invention will be more fully understood and further advantages will become apparent when reference is made to the following detailed description of the preferred embodiment of the invention and the accompanying drawings in which.

3. DETAILED DESCRIPTION OF THE INVENTION

Figure 1:
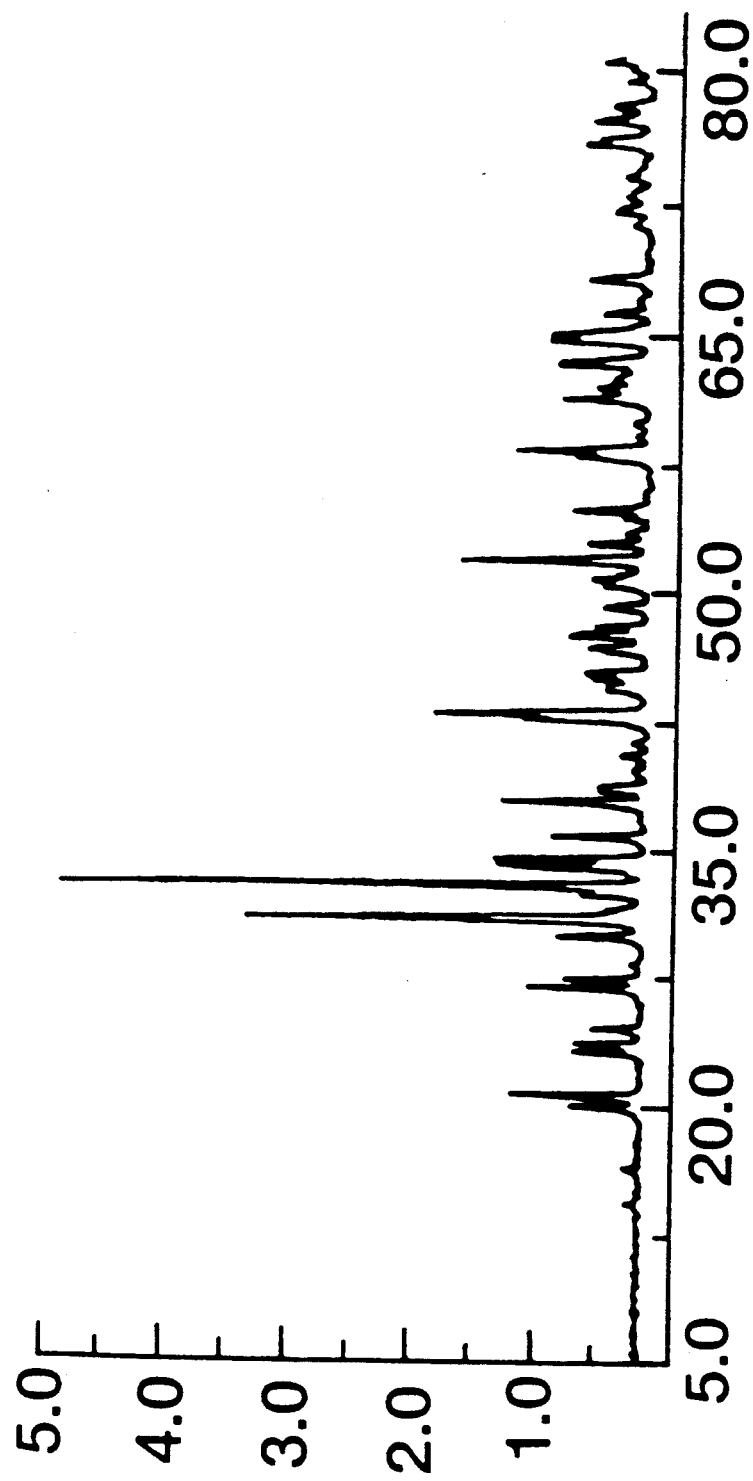
FIG. 1 is an x-ray diffraction pattern of the compound $LaSi_3N_5$, produced in accordance with the method of this invention.

The present is directed to a compound of the formula $LnSi_3N_5$ wherein Ln is selected from the group consisting of scandium, yttrium, cerium, praseodymium, neodymium, promethium, samarium, europium, gadolinium, terbium, dysprosium, holmium, erbium, thulium, ytterbium and lutetium.

Particularly preferred are compounds of the formula $LnSi_3N_5$ where Ln is selected from scandium, yttrium, samarium, cerium, neodymium, gadolinium, dysprosium, and erbium. The compound of the present invention preferably is in powder form having an equivalent diameter of less than 50 micrometers, preferably less than 10 micrometers and most preferably from 0.1 to 10 micrometers. By equivalent diameter, it is meant the diameter of a sphere having the same volume as the particle. Particularly preferred are compounds of the formula $LnSi_3N_5$, wherein Ln is Pr, Nd, and Sm.

The present invention includes a method to make a compound having the formula $Ln'Si_3N_5$ where Ln' is selected from the group consisting of lanthanum, scandium, yttrium, cerium, gadolinium, terbium, dysprosium, holmium, erbium, thulium, ytterbium and lutetium.

The method comprises the step of reacting $SiO_z$ and $Ln'_xO_y$ in a nitrogen atmosphere in the presence of carbon at a temperature of from 1200° C. to 2000° C., preferably 1200° C. to 1800° C., more preferably 1300° C. to 1500° C. and most preferably 1400° C. to 1450° C. z is selected from an integer of 1 or 2; x is an integer of at least 2 and y is an integer of at least 3. The formula $Ln'_xO_y$ should have an x and y selected so that the compound is stable. While any suitable pressure can be used when temperatures are in the higher ranges of from 1800° C. to 2000° C. it is necessary to use higher than atmospheric pressure. The reaction is conducted for at least 2 hrs. and preferably 4 to 8 hours. The higher the temperature, the lower the time. Preferred conditions are to conduct reaction at about atmospheric pressure at a temperature of from 1300° C. to 1500° C. for a reaction time of 4 to 8 hours.

The $SiO_z$, preferably $SiO_2$, is in a powder form wherein the powders have equivalent diameters of less than 50 μm, preferably less than 10 μm and most preferably less than 2 μm. The silicon dioxide preferably is in the form of very fine powder such as "foamed" silica.

The $Ln'_xO_y$ is preferably $Ln'_2O_3$. It is preferably a powder having an equivalent diameter of less than 50 μm, preferably less than 10 μmm, and most preferably less than 2 μm.

The carbon used preferably is in a powder form having an equivalent diameter of less than 50 μm, preferably less than 10 μm and more preferably less than 2 μm.

The relative amounts of the $SiO_z$, $Ln'_xO_y$ and carbon are stoichiometric quantities. A slight excess carbon is usually preferred. Nitrogen is continually supplied as a gas over the reacting mixture. A preferred formula for conducting the reaction is:

$$6SiO_2 + Ln'_2O_3 + 7.5C + N_2 \rightarrow 2Ln'Si_3N_5 + CO/CO_2$$

There can be an excess of carbon used and an excess of nitrogen used. The carbon reacts with the oxygen to form carbon monoxide or carbon dioxide which is removed as a gas.

Preferably, the powders are physically mixed with a suitable carrier liquid which can be an organic liquid, preferably alcohol, most preferably isopropanol. The mixing is conducted at atmospheric pressure and temperature for up to 10 hrs., preferably from 3 to 10 hrs. The mixed reactants are dried under a hood at atmospheric pressure or in an oven at temperatures up to about 150° C. The reaction mixture is put into a suitable container and heated in a tube furnace. The reaction takes place in solid state resulting in black powder. Each particle of powder has a diameter which depends on the diameter of the starting material. Preferably the diameter is less than 10 μm. More preferably less than 5 μm, and most preferably less than 2 μm. The particles that initially come from the reaction mixture are black from excess carbon. Excess carbon can be burned off in an air furnace at a temperature up to about 700° C., preferably from about 500° C. to 650° C. and most preferably about 500° C. to 600° C. This results in a gray powder which is the product.

Laboratory amounts are made in batches. However, continuous processes with rotary furnaces can be used to commercially make the compounds of the present invention.

The present invention is directed to a group of new ternary nitride compounds which can be prepared without the need for high temperatures and pressures. These materials are stable and have the indicated crystalline structures. The materials are self-sinterable, non-oxide ceramics. They can be used as oxygen-free sintering additives for non-oxide ceramics such as silicon nitride.

The compounds of the present invention can be gas pressure sintered, hot-pressed or hot-isostatically pressed to full density without the need for oxide or other sintering aids. Gas pressure sintering is conducted under a pressure of nitrogen from 0.1 to 25, preferably from 2 to 15, and most preferably from 7 to 10 MPa. Sintering is conducted under a nitrogen atmosphere at a temperature ranging from 1800° C. to 2100° C., preferably from 1850° C. to 2050° C., and more preferably 1900° C. to 2000° C.; for up to 50 hrs., preferably from 1 to 10 hrs. and most preferably from 1 to 3 hrs.

The examples set forth below illustrate the nature of the invention and the manner of carrying it out. However, the invention should not be considered as being limited to the details thereof.

EXAMPLE 1

Preparation of $LaSi_3N_5$

1. Preparation of mixture of lanthanum oxide, silica and carbon. A mixture of silica (Alfa, Large Pore, 19.3 g), lanthanum oxide (Davison, 99.99%, 17.4 g) and carbon (Fisher, Darco G-60 Activated, 12.9 g) were wet milled for 24 hrs. in a polyethylene jar using zirconia grinding media and isopropanol (200 mL) as a fluid. The solvent was allowed to evaporate and the solids dried in a vacuum oven (115° C., 16 hrs.). The mixture was returned to the jar and milled (2 hrs.) to produce a homogeneous fine powder.

2. Nitridation. A sample of the above mixture (3.78 g) was placed in an alumina boat and the boat loaded into a 3" od. alumina tube in a 1700° C. tube furnace. The tube was sealed, evacuated, and refilled with dry, oxygen free nitrogen. After a second evacuation and refill cycle, the following heating cycle was used:

| room temperature | 5 hrs. |
|---|---|
| heat | 150° C./hr. |
| 1405° C. | 4 hrs. |
| cool | 150° C./hr. |
| (to room temperature) | |

Figure 2:
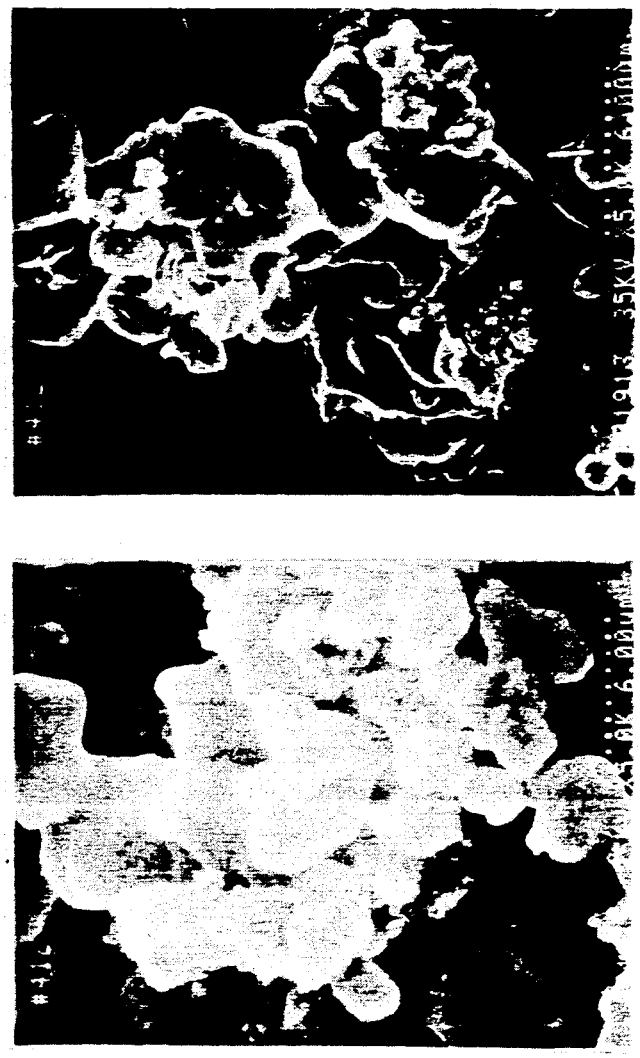
FIG. 2 is a scanning electron micrograph of the compound $LaSi_3N_5$ as produced by the method of the present invention.

The sample was removed from the oven and weighed (2.28). The black powder was transferred into a porcelain crucible and heated in a muffle furnace (665° C., 6 hrs. hold) to remove the excess carbon. The resulting gray powder (2.10 g, 88.5% of theoretical) was identified as $LaSi_3N_5$ based on its x-ray diffraction (XRD) pattern as shown in FIG. 1. X-ray diffraction agrees with literature report, Inoue, Z; Mitomo, M; Ii, N., *J. Mat. Sci.*, Vol. 15 (1980) pp. 2915-2920: elemental analysis for $LaSi_3N$ found (calculated): C=0.28%, H=0.34%, N=24.70% (23.90). The morphology of the $LaSi_3N_5$ is shown in FIG. 2.

EXAMPLE 2

Synthesis of $LaSi_3N_5$ From Coprecipitated Mixture of $SiO_2$ With $La_2O_3$ 1. An aqueous solution of lanthanum acetate (417.4 g of a 0.49 mol/kg solution) was dripped into a solution of tetraethoxysilane (TEOS, $Si(OC_2H_5)_4$, 203.8 g) in isopropanol (250 ml). Aqueous ammonia (28%, 30 mL) was then added to the mixture. The resultant slurry was spray dried in a nitrogen atmosphere to produce 75 g of a white, free-flowing powder which was characterized as follows: weight loss on drying (120° C.)=9.07%; elemental analysis after calcination at 500° C., found: C=0.52%, H=0.52%, Si=20.9%, La=34.4% (ratio of Si:La=3.02:1); SEM shows a mixture of clusters of 0.5-1.5 micron spherical particles and individual particles up to 4 mm.

2. Preparation of mixture of the coprecipitated oxides with carbon powder. The above powder mixture (30 g) was milled with carbon (Fisher, Darco G-60 Activated, 11.7 g) following the procedure described for Example 1.

3. Nitridation. A sample of (17.2 g) was subjected to carbothermal reduction following the procedure described above for Example 1, with the exception that the reaction temperature was 1449° C. After calcination at 650° C. for 6.5 hours, 7.6 g of gray powder was isolated and identified as $LaSi_3N_5$ (84.8% yield). Elemental analysis of the product found (calculated for $LaSi_3N_5$): C=0.52%, H=0.05%, N=22.4%(23.9%), La=47.1%(47.4%), Si=27.1%(28.7%). Analysis by X-ray diffraction (XRD) showed only one phase which was identified as $LaSi_3N_5$ by comparison with the pattern reported in the literature. SEM analysis showed the powder to predominately consist of 2-3 mm cube-shaped irregular particles.

EXAMPLE 3

Preparation of Mixed $LaSi_3N_5$ With $Si_3N_4$ Using Coprecipitated Oxides

1) Preparation of coprecipitated oxides. Following the procedure used in the synthesis of Example 2, described above, 442.1 g of TEOS were dissolved in 450 mL of isopropanol, mixed with 284.4 g of a 0.49 mol/kg aqueous solution of lanthanum acetate, and 50 mL of aqueous ammonia added. After spray drying, 120 g of product was isolated, analyzed by x-ray diffraction, and found to be amorphous. After calcination at 1400° C., the presence of $SiO_2$, SiO, and $La_2O_3$ were detected.

2) Preparation of mixture of coprecipitated oxides with carbon. Following the procedure used in Example 1, 21.4 g of the above sample (dried at 120° C.) were milled with 9.72 g of carbon (Fisher, Darco G-60 Activated).

3) Nitridation. Following the procedure used in Example 1, described above, 3.74 g of the mixed powder sample were subjected to carbothermal reduction. After calcination, the resultant gray powder was analyzed by x-ray diffraction and found to contain a mixture of alpha- and beta-silicon nitrides with lanthanum silicon nitride, $LaSi_3N_5$. Elemental analysis, found: C=1.2%, H=0.10%, N=33.0%.

EXAMPLE 4

Preparation of $SmSi_3N_5$ From Mixed Oxides

1) Preparation of mixture of samarium oxide, silica and carbon. A mixture of silica (Alfa, Large Pore, 20.3 g), samarium oxide (Cerac 19.7 g) and carbon (Fisher, Darco G-60 activated, 13.5 g) were wet milled for 23 hours in a polyethylene jar using zirconia grinding media and isopropanol as the fluid. The solvent was allowed to evaporate and the solids dried in an oven. The mixture was returned to the jar and milled (2 hr) to produce a homogeneous fine powder.

2) Nitridation. The sample (6.15 g) was placed in two alumina boats and the boats loaded into a 3" od. alumina tube in a 1700° C. tube furnace. The tube was sealed, evacuated, and refilled with dry, oxygen free nitrogen. After a second evacuation and refilling with dry, oxygen free nitrogen, the tube was purged with dry nitrogen at a rate of 1 L/min. The following heating cycle was used:

| room temperature | 5 hr. |
|---|---|
| heat | 150° C./hr |
| 1450° C. | 4 hr |
| cool | 150° C./hr |
| (to room temperature) | |

Figure 3:
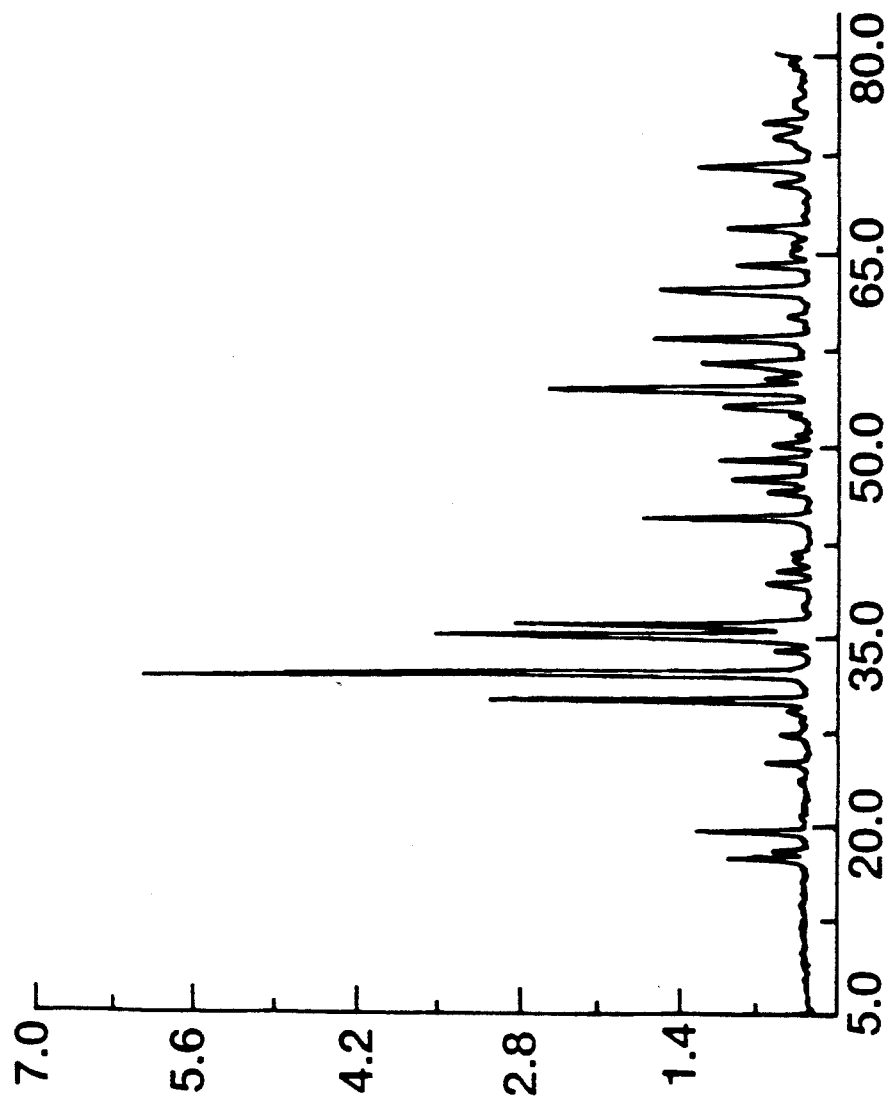
FIG. 3 is an x-ray diffraction pattern of the compound $SmSi_3N_5$ produced in accordance with the invention.

The sample was removed from the oven and weighed (3.94 g). The black powder was transferred into a porcelain crucible and heated in a muffle furnace (650° C., 6.5 hr. hold) to remove the excess carbon. The resulting gray powder (3.70 g, 93.5% of theoretical) was isolated and characterized by XRD. The XRD pattern of this compound is shown in FIG. 3. It is unexpectedly quite different from that of LaSi$_3$N$_5$ (cf. FIG. 1). However, both LaSi$_3$N$_5$ and SmSi$_3$N$_5$ have orthorhombic symmetry with different atomic spacings. Elemental analysis found (calc. for SmSi$_3$N$_5$) C=2.55, N=20.23 (23.00), Sm=51.3 (49.4), Si=27.8 (27.6).

EXAMPLE 5

Preparation of CeSi$_3$N$_5$ From SiO$_2$ And Cerium (III) Acetate

1) Preparation of mixture of silica, cerium (III) acetate and carbon powder. Silica (17.7 g) and cerium (III) acetate (Ce(CH$_3$CO$_2$)3.3/2H$_2$), 32.8 g) were milled with carbon (Fisher, Darco G-60 activated, 11.4 g) using isopropanol (150 mL) as the grinding fluid. The sample was dried in a nitrogen atmosphere to prevent oxidation of the cerium.

2) Nitridation. A sample was loaded into two boats and subjected to carbothermal reduction following the procedure described in Example 4, with the exception that the reaction temperature was 1465° C. The sample was examined by x-ray diffraction and found to contain a phase isostructural with that of LaSi$_3$N$_5$. one portion of the sample was calcined in a nitrogen atmosphere while the second was calcined in air. After calcination at 650° C. for 6.5 hours, the samples were examined by x-ray diffraction. The sample which had been calcined in nitrogen was found to contain the same phase as before the heat treatment. In contrast, the sample heated in air was found to contain an amorphous phase and a mixture of cerium oxide.

EXAMPLES 6–9

Preparation of Other LnSi$_3$N$_5$ Compounds

Samples of LnSi$_3$N$_5$ with Ln=Ce, Pr, Nd, Dy, Gd, Ek and Yb were prepared following the procedures described in Example 4 above for SmSi$_3$N$_5$. The elemental composition (calculated values in parenthesis) and the crystalline symmetry of these compounds are shown in Table 1:

TABLE 1

| Ex. | Ln | C(Å) | N(Å) | Ln(Å) | Si(Å) | Phase |
|-----|----|------|------|-------|-------|-------|
| 6 | Nd | | | | | "La"/"Sm" |
| 7 | Gd | 2.58 | 19.5(22.5) | 49.3(50.5) | 26.2(27.0) | "Sm" |
| 8 | Dy | 1.84 | 20.1(22.1) | 53.1(51.3) | 28.4(26.5) | "Sm" |
| 9 | Er | | | | | "Sm"/U |

Notes:
"La" stands for Isostructural with LaSi$_3$N$_5$
"Sm" stands for Isostructural with SmSi$_3$N$_5$
U stands for Unidentified Phase

EXAMPLE 10

Self-Sintering of Lanthanum Silicon Nitride

Our initial sample for the pressureless sintering experiments were prepared by ball-milling the lanthanum silicon nitride powder in alcohol and slip casting the resulting slurry into cylindrical billets using a plaster mold. Note that in contrast with the densification of silicon nitride, no sintering acids were mixed with the lanthanum silicon nitride powder. After drying, the billets were fired in a graphite furnace at 1 atm of nitrogen. Further sintering experiments under these conditions led to mixed results. At 1850° C./3 h very little shrinkage occurred. At about 1900° C., extensive densification took place in one run but XRD analysis of the dense specimen showed the presence of amorphous phases. In a second run at 1900° C., the sample decomposed and XRD analysis showed that Si and LaSi$_2$ had formed. These sintering experiments define the decomposition temperature for LaSi$_3$N$_5$ in 1 atm of nitrogen at about 1900° C., and suggest that sintering of this material must be pursued under elevated N$_2$ pressures.

Additional sintering experiments were therefore conducted at 1900° C. under 3000 and 1000 psi of nitrogen, yielding lanthanum silicon nitride billets sintered to near full density as the data of Table 2 show. XRD analysis showed that all samples were LaSi$_3$N$_5$, but sample B contained trace quantities of silicon oxynitride, Si$_2$N$_2$O, as well. Cross sections of sample B showed uniform morphology. On the other hand, sample A had a porous core surrounded by a ring of material which was pore-free and had a thickness of about 1 mm. The density reported for sample A in Table 2 is the bulk density of the entire sample.

TABLE 2

Densification of Synthesized Lanthanum Silicon Nitride at 1900° C.

| Sample | Pressure psi | Hold h | Density % TD |
|--------|--------------|--------|--------------|
| A | 3000 | 2.0 | 90 |
| B | 1000 | 1.5 | 93 |

Figure 4:
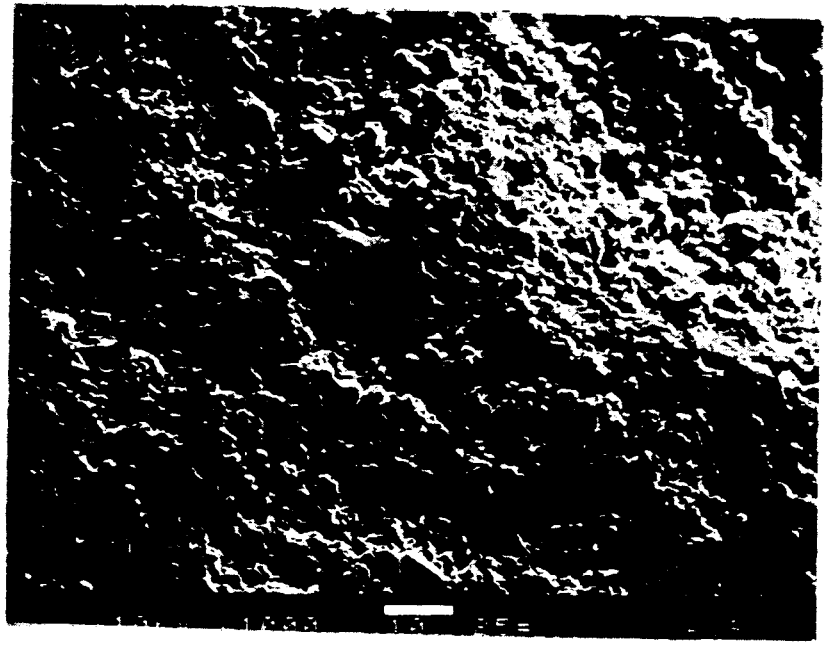
FIG. 4 is a scanning electron micrograph of a fracture surface of self-sintered $LaSi_3N_5$ produced in accordance with the invention.
Figure 5:
FIG. 5 is a transmission electron micrograph of self-sintered $LaSi_3N_5$ produced in accordance with the invention.

SEM micrographs of fracture surfaces of the porous core (see FIG. 4) show that the grains are about 1 μm in size, but some very large grains (up to 50 μm) are also present. These large grains contain various fractions of occluded pores. TEM micrographs, FIG. 5, show that sintered lanthanum silicon nitride does not have glassy grain boundary phases. All grain boundaries were found to be crystalline with grain boundary pocket phases having lath-like precipitates within them. This is in contrast to silicon nitride ceramics in which grain boundaries are entirely or partly amorphous due to the oxide sintering aids which are used to densify it. The modulus of sintered lanthanum silicon nitride was measured by Knoop indenter microindentation techniques and is reported in Table 3. Though the Knoop microindentation technique is reputed to estimate Young's modulus to within +10%, we have found it to underestimate this property by about 15–20% for silicon nitride as compared to accurate values obtained from stress-strain measurements. The modulus value given for the pore-free region of sample A, i.e. 249 GPa, is therefore close to the value for silicon nitride. The hardness data given in Table 3 also shows that the hardness of lanthanum silicon nitride is almost equal to that of silicon nitride.

TABLE 3

Mechanical Properties of Dense LaSi$_3$N$_5$

| Sample | Hardness kg/nm$^2$ | Modulus GPa |
|--------|--------------------|-----|
| A (Pore Free) | 1497 | 149 |
| A (Porous) | 935 | 173 |
| B | 1470 | 217 |
| silicon nitride | 1400 | 300 |

EXAMPLE 11

Lanthanum silicon nitride powders can also be dispersed in water using Darvan C as a dispersant. Slip cast billets from water-Darvan C dispersions have been densified to better than 96% theoretical density at 1900° C. for 3 hrs. under 1500 psig of nitrogen gas. Typical mechanical properties are shown in Table 4.

TABLE 4

Mechanical Properties of LaSi$_3$N$_5$

| | |
|---|---|
| Hardness (Vickers) | 1503 kg/mm$^2$ |
| Thermal Expansion Co-efficient, (Avg. 25–1000° C.) | 5.85 × 10$^{-6}$ C$^{-1}$ |
| Flexural strength (4-pt bend) | 33.0 ksi |
| Fracture toughness, K$_{1C}$ (ISB Method) | 3.1 MPa · m$^{0.5}$ |

What is claimed is:

1. A compound having the formula LnSi$_3$N$_5$ wherein Ln is selected from the group consisting of scandium, yttrium, cerium, praseodymium, neodymium, promethium, samarium, europium, gadolinium, terbium, dysprosium, holmium, erbium, thulium, ytterbium and lutetium.

2. A method for making Ln'Si$_3$N$_5$ wherein Ln' is selected from the group consisting of lanthanum, scandium, yttrium, cerium, praseodymium, neodymium, promethium, samarium, europium, gadolinium, terbium, dysprosium, holmium, erbium, thulium, ytterbium and lutetium, comprising the step of reacting SiO$_2$, Ln'$_x$O$_y$ in a nitrogen atmosphere in the presence of carbon at a temperature of from 1200° C. to about 2000° C. for at least 2 hrs., x being an integer equal or greater than 2, y being an integer equal or greater than 3, and z is an integer selected from 1 and 2, with the proviso that x and y are selected to result in a stable compound of Ln'$_x$O$_y$.

3. The method of claim 2, wherein x is 2, y is 3 and z is 2.

4. The method of claim 2, wherein the reaction is conducted at about atmospheric pressure.

5. The method of claim 2, wherein the SiO$_z$, Ln'$_x$O$_y$ and carbon are present in approximately stoichiometric amounts.

6. The method of claim 3, wherein the reaction is conducted in solid state.

7. The method of claim 2, wherein the SiO$_z$, Ln'$_x$O$_y$ and carbon are powders of less than 50 μm in equivalent diameters.

8. The method of claim 7, wherein the powders have an equivalent diameter of less than 10 μm.

9. The method of claim 8, wherein the powders have an equivalent diameter of less than 2 μm.

10. The method of claim 2, further comprising the steps of physically mixing powders of SiO$_z$, Ln'$_x$O$_y$ and carbon, and heating the mixture from about 1200° C. to about 2000° C. for at least 2 hrs. under nitrogen gas.

11. The method of claim 2, wherein the temperature is maintained from about 1300° C. to about 1500° C. for about 4 to 8 hours.

* * * * *